(12) United States Patent
Jonas et al.

(10) Patent No.: US 6,395,830 B1
(45) Date of Patent: May 28, 2002

(54) SUPERABSORBANTS WITH CONTROLLED ABSORPTION SPEED

(75) Inventors: Gerd Jonas, Kempen; Klaus Pflueger; Richard Mertens, both of Krefeld, all of (DE)

(73) Assignee: Stockhausen GmbH & Co. KG, Krefeld (DE)

( * ) Notice: Subject to any disclaimer, the term of this patent is extended or adjusted under 35 U.S.C. 154(b) by 0 days.

(21) Appl. No.: 09/403,030

(22) PCT Filed: Apr. 17, 1998

(86) PCT No.: PCT/EP98/02287

§ 371 (c)(1),
(2), (4) Date: Oct. 21, 1999

(87) PCT Pub. No.: WO98/47951

PCT Pub. Date: Oct. 29, 1998

(30) Foreign Application Priority Data

Apr. 21, 1997 (DE) .......................................... 197 16 657

(51) Int. Cl.⁷ ................................................. C08F 8/32
(52) U.S. Cl. ................. 525/102; 525/929.8; 525/329.9; 525/342
(58) Field of Search .............................. 525/102, 329.8, 525/329.9, 342

(56) References Cited

U.S. PATENT DOCUMENTS

| 5,447,727 A | 9/1995 | Graham |
| 5,610,220 A | 3/1997 | Klimmek et al. |
| 5,676,660 A | * 10/1997 | Mukaida et al. ............ 604/375 |

FOREIGN PATENT DOCUMENTS

| DE | 42 44 548 | 7/1994 |
| DE | 44 18 818 | 1/1995 |
| DE | 43 33 056 | 3/1995 |
| DE | 44 14 117 | 10/1995 |
| DE | 44 26 008 | 1/1996 |
| DE | 44 43 824 | 6/1996 |
| DE | 44 43 825 | 6/1996 |
| DE | 195 29 348 | 2/1997 |
| EP | 0 288 865 | 11/1988 |
| EP | EP 0543303 | 5/1993 |
| EP | 0 693 508 | 1/1996 |
| EP | 0 705 643 | 4/1996 |
| EP | 0 712 659 | 5/1996 |
| WO | WO 92/00108 | 1/1992 |
| WO | 94/09043 | 4/1994 |
| WO | WO 95/11932 | 5/1995 |
| WO | WO 95/21876 | 8/1995 |
| WO | WO 95/27739 | 10/1995 |
| WO | WO 96/05234 | 2/1996 |

OTHER PUBLICATIONS

Patent Abstracts of Japan, vol. 18, No. 4 (C–1149), Jan. 6, 1994, JP 5–247124, Sep. 24, 1993.

* cited by examiner

Primary Examiner—Bernard Lipman
(74) Attorney, Agent, or Firm—Oblon, Spivak, McClelland, Maier & Neustadt, P.C.

(57) ABSTRACT

The invention relates to hydrophilic, highly swellable polymers for aqueous fluids, e.g. superabsorbants, which are coated with reactive, water-insoluble, film-forming, hydrophobic polymers and an additional reactive constituent which can react with carboxyl groups of carboxylate anions and form additional cross-links on the particle surface. The invention also relates to the production of superabsorber thus coated and their use in hygiene articles used to absorb body fluids. The products obtained by coating highly swellable, hydrophilic, insoluble polymers with reactive, water-insoluble, film-forming, hydrophobic polymers and an additional reactive component are characterized in that their absorption speed cam be adjusted in an controlled manner extended area according to the type and amount of reactive, water-insoluble, film-forming, hydrophobic polymers used in the coating and according to process engineering conditions chosen for said coating.

17 Claims, 6 Drawing Sheets

SUPERABSORBANTS WITH CONTROLLED ABSORPTION SPEED

The invention relates to hydrophilic, highly swellable polymers for aqueous liquids, so-called superabsorbers, which are coated with reactive, water-insoluble, film-forming, hydrophobic polymers and an additional reactive component capable of reacting with carboxyl groups or carboxylate anions to form additional crosslinking sites on the particle surface, the production of such coated superabsorbers and their use in hygienic articles used for absorbing body fluids.

Highly swellable polymers which may be obtained by polymerization of unsaturated acids such as acrylic acid, methacrylic acid, acrylamidopropanesulfonic acid, etc., or partially neutralized in the form of the alkali or ammonium salts thereof, in the presence of small amounts of polyunsaturated compounds are already known.

Likewise, superabsorbent crosslinked polymers which may be obtained by graft copolymerization of unsaturated acids onto various matrices, such as polysaccharides, polyvinyl alcohols, polyalkylene oxides and derivatives thereof, are well-known. The highly swellable polymers mentioned are remarkable for their ability to absorb large quantities of aqueous liquids such as blood or urine with swelling and formation of hydrogels and retain the absorbed quantity of liquid even under pressure.

As a result of their characteristic absorbing properties, these polymers are preferably used as absorbents in hygienic articles.

According to the state of the art, the properties of these hydrogels can be modified by a surface treatment using specific substances. To this end, conventional hydrogels which have been dried, milled and optionally screened, are reacted in the form of powders with reactive compounds, i.e., compounds containing groups capable of reacting with the carboxyl groups of the hydrogels to give covalent crosslinking on the surface of the granulate particles. These reactive compounds may be di- or polyols, bisepoxides, higher epoxides, or cyclic carbonic esters as well.

Such surface crosslinking has been described in DE 40 20 780 C1, for example, where alkylene carbonates are employed as surface crosslinkers.

The surface treatment of hydrophilic, highly swellable polymers using reactive substances for the purpose of surface crosslinking has been described in numerous other publications.

EP-A 349,240 (to achieve balance between absorptive capacity and absorption rate as well as gel stability and absorbency) describes an aftertreatment of polymers using crosslinking agents including two or more functional groups, which may undergo reaction with the carboxyl or carboxylate groups or other groups contained in the polymer. Conventionally, the hydrophilic, highly swellable powdered polymer is directly mixed with one or more reactive hydrophilic components, optionally using water and organic solvents.

Inter alia, EP-B 317,106 describes di- or polyols, di- or polyglycidyl ethers, haloepoxy compounds, polyisocyanates, polyamines, polyfunctional aziridine compounds, or alkyl di(tri)halides as reactive, surface-crosslinking components.

Surface subsequent crosslinking is effected by performing a thermal treatment of the products subsequent to coating the superabsorbent polymer powders.

The above-described procedures have in common that a significant improvement of the absorptive capacity under pressure for aqueous liquids such as urine, blood or other body fluids is achieved through the thermal treatment of the highly swellable, powdered polymers in the presence of the reactive components mentioned.

The surface treatment of granulated, hydrophilic, highly swellable polymers using additives for dedusting the granulated polymers, e.g., using polyols or polyethylene glycols in PCT/US93/02872, is also well-known. The laid-open document DE 44 26 008 A1 refers to the use of non-reactive, water-insoluble, film-forming polymers of, inter alia, homo- and copolymerizates of acrylic and methacrylic esters, vinyl esters, polyamides, polyesters for dedusting and improving the abrasion resistance. For the same purpose of improving the abrasion resistance, but also in order to reduce the caking tendency, the DE 195 24 724 A1 describes a surface treatment using non-reactive, water-soluble waxes. DE 44 14 117 A1 describes the use of non-reactive polysiloxanes, e.g., polydimethylsiloxanes and polymethylphenylsiloxanes for the surface treatment of hydrophilic, highly swellable polymers for use in dedusting a superabsorbent polymer.

EP-A 705,643 A1 refers to water-absorbing polymers having improved properties, which are obtained by treating crosslinked polymers based on acrylic acid or the salts thereof with a modified silicone oil having functional groups capable of reacting with carboxyl groups and/or carboxylate groups, with amino and epoxy-functional silicones being mentioned as examples. The silicones may be applied as substance, as a solution in an organic solvent, or as an emulsion. If necessary, the polyacrylate/silicone blend may be postcured at temperatures of 60–200° C.

The products obtained using the described functional silicone oils and the described process have improved anti-caking performance and a reduced dusting tendency. In particular, the absorption under pressure is markedly improved by the treatment described. The products have good initial absorption under pressure and absorptive capacity. The Examples 1 through 4 used in EP-A 705,643 show that the absorption of the products including functional silicone oil is higher both prior to and after postcure of the materials after 10 minutes and thus, the absorption rate is higher compared to the material according to Comparative Examples 1 through 8, which has not been surface-treated.

Therefore, the absorbent polymers from EP-A-705,643 also belong to those superabsorbers that are conventional in this respect, tending to rapid absorption of an aqueous liquid immediately upon contact with such a liquid, giving rise to rapid swelling near the entry site and so-called gel blocking.

Likewise, methods and additives for improving the absorption rate of superabsorbent hydrophilic polymers have been known for a long time.

DE 44 18 818 A1 describes the addition of, inter alia, $CO_2$, alkaline, alkaline earth and ammonium carbonates and bicarbonates to the monomer solution as expanding agent, in order to enhance the absorption rate of highly swellable polymers.

The U.S. Pat. No. 4,548,847 describes hydrogels reversibly crosslinked by at least bivalent metal cations, such as $Ca^{2+}$ or $Ba^{2+}$. By co-using a substance capable of removing the metal cations, it is possible to achieve delayed swelling. Water-soluble chelating agents such as $Na_2HPO_4$, sodium hexametaphosphate and the disodium salt of ethylenediamine tetraacetate are preferably used. These substances cause the reversible crosslinking sites formed by said at least bivalent metal cations to be degraded by complexing. The dropping crosslinking density permits stronger swelling of the products. The patent also describes absorbent articles such as wound dressings and tampons which contain the absorbent polymers having delayed swelling characteristics. Among other things, an absorbent article (wound dressing) made up of layers is described, wherein the polymer of the invention is contained at certain points in each layer. Combinations of the polymer according to the invention with other polymers absorbing aqueous liquids are not mentioned.

The patent applications GB 2,280,115 A and WO 95/00183 describe an absorbent article containing covered superabsorbent particles in that area into which body fluid is released. The cover of the superabsorbent particles prevents swelling thereof until the cover has dissolved in the test liquid or body fluid or is penetrated by same. Thus, they are superabsorbent particles having an activation period until swelling begins, which period can be varied by means of the cover material and the thickness thereof. Non-reactive polysaccharides such as gelatin, micro-crystalline cellulose and cellulose derivatives are mentioned as cover materials. The activation period until swelling begins should be at least five, preferably 15, and more preferably 60 minutes.

The application FR 2,627,080 A1 also describes absorbent articles containing multiple superabsorbers which exhibit a swelling behavior with varying delay. The superabsorbers described consist of polyacrylates provided with a gradually dissolving cover.

Superabsorbers involving such surface treatment are disadvantageous in that even minor initial wetting—without necessarily inducing swelling of the highly swellable polymer by itself—will result in a deterioration of the treated surface by dissolving or peeling, swelling or decomposition. Once the cover of the polymer has dissolved, these superabsorbers have a swelling rate like that of a conventional material which has not been surface-treated. As a result, the desired effect of improved liquid management in the absorbent article is lost.

Superabsorbers having a slow, preferably constant swelling rate without the behavior of delayed initial swelling and their use in absorbent articles have not been described in GB 2,280,115 A, WO 95/00183 and FR 2,627,080 A1.

The patent application EP 0,631,768 A1 describes an absorbent article in which as well, superabsorbers having varying absorption rate are used. The differences between the various superabsorbers used are due to a different grain size distribution (type 1: 600–850 $\mu$m, type 2: <250 $\mu$m) and are accordingly small. Surface-treated superabsorbers and their use in absorbent articles have not been described therein.

The development towards thinner and thinner diaper constructions in the field of hygienics is associated with a higher compacting of the absorbent core and an increase of the superabsorber ratio in the superabsorber/cellulose mixture. As a result, the homogeneous liquid distribution within the absorbent core becomes a more and more important criterion for full-scale utilization of the storage capacity of the highly swellable polymer.

The reduction of the cellulose amount in the absorbent core has an adverse effect on the liquid distribution. Meanwhile, the use of additional means such as special fleeces in order to optimize the liquid distribution has become state of the art.

Additional demands with respect to the liquid management are made on the highly swellable, liquid-storing polymers as well. Even in a superabsorber/cellulose mixture having a high ratio of highly swellable polymers, the liquid-storing polymers must permit or support rapid distribution of liquid within the superabsorber/cellulose mixture.

Conventional superabsorbers which are frequently optimized for a high liquid absorption rate in particular, have a tendency to absorb and store an aqueous liquid immediately upon contact with such a liquid, which is associated with a massive volume increase of the polymer particles.

In the vicinity of the entry site of body fluid into the absorbent core, the absorbent polymers undergo massive swelling as a result of their high absorption rate for aqueous liquids, because the distribution of liquid is slower than the liquid storage by the highly swellable polymer as a result of the low cellulose ratio in the absorbent core. Owing to this rate difference, a major part of the liquid is absorbed in the immediate vicinity of the entry site.

Moreover, this effect is reinforced in that the swelling of a conventional superabsorber takes place in such a way that immediately upon addition of liquid, a very high absorption rate for aqueous liquids is observed, in association with a steep increase of absorption. After a few minutes already, a highly swellable polymer based on crosslinked, partially neutralized polyacrylate has reached about 95% of its absorptive capacity under conditions of free swelling. Thereafter, the amount of absorbed liquid asymptotically approaches its equilibrium value. As a result, an excessive proportion of liquid per unit time it taken up by the described highly swellable polymers immediately after addition of the liquid to be absorbed. This behavior is a typical material property of crosslinked polyacrylates.

As a result of the expansion of the polymer particles associated with the absorption of liquid, the interstices and pores of the SAP fluff matrix close within the absorbent core area around the entry site of the body fluid. As the liquid transport through a swelled hydrogel by diffusion is some magnitudes slower compared to the flow in interstices, blocking occurs in this area. This effect is frequently referred to as so-called "gel blocking" in literature. Succeeding amounts of body fluid cannot penetrate the absorbent core and will be transported randomly over the surface of the already surface-saturated area up to the edge of same.

As a consequence, the reverse wetting behavior and leakage behavior are deteriorated. In addition, the storage capacity of the absorbent core is reduced because highly absorbent polymers embedded deeper in the absorbent core can no longer be reached by additional body fluid from later dosages as a result of swelling of the particles at the surface and thus, cannot contribute to the overall storage capacity.

It is therefore the object of the present invention to provide highly swellable polymers wherein the rate of liquid absorption can be adjusted over a wide range in a controlled fashion.

It is another object of the present invention to provide highly swellable polymers wherein the liquid absorption preferably proceeds at a constant rate over a wide range.

It is another object of the present invention to provide highly swellable polymers having controlled absorption rate and sufficient flowability, which may be used in absorbent hygienic articles.

It is also an object of the present invention to provide highly swellable polymers which, by controlled adjustment of the liquid absorption rate, optimize the above-described unfavorable and thus, undesirable relationship between swelling rate of the superabsorber and distribution rate of body fluid in the absorbent core for aqueous liquids.

Moreover, it is an object of the present invention to achieve more effective utilization of the overall storage capacity of the amount of highly swellable polymer contained in the respective hygienic article.

In addition, it is an object of the present invention to reduce the adverse effect of gel blocking on the liquid distribution in the absorbent core.

It is still another object of the present invention to provide a process for producing highly swellable polymers having controlled absorption rate and sufficient flowability.

Surprisingly, it has been found that highly swellable polymers absorbing aqueous liquids, which polymers are constituted of monoethylenically unsaturated monomers bearing acid groups and optionally, other monomers copolymerizable therewith and optionally, water-soluble polymers suitable as basis for grafting, and polyunsaturated monomers acting as crosslinkers, exhibit the above-described desirable swelling behavior, namely, a controlled retardation of the absorption process controllable as to its degree, in association with a constant swelling rate, by being coated with a reactive, water-insoluble hydrophobic polymer and another reactive component capable of reacting with carboxyl groups or carboxylate ions to form additional crosslinking sites on the particle surface, and postcured at a specific temperature.

It has also been found that using hydrophobic polymers to be used according to the invention together with another reactive component capable of reacting with carboxyl or carboxylate groups, thereby resulting in additional crosslinking on the surface of the highly swellable, hydrophilic polymer particles, e.g., ethylene carbonate or polyhydric alcohols (glycerol etc.), has a substantially higher impact on the swelling rate as is the case without post-crosslinking agent. As a rule, quantities of from 0.1 wt.-% to 1 wt.-% of post-crosslinking agent and between 0.005 and 2% of the hydrophobic polymer of the invention are used in surface post-crosslinking.

Thereby, products having a controlled absorption rate for aqueous liquids can pe produced, the flowability of which being within a range that permits machine processing.

Accordingly, the present invention relates to a hydrophilic, highly swellable, powdered polymerizate, characterized in that it is coated with a reactive, water-insoluble polymer and subsequently treated at elevated temperature in the presence of a post-crosslinking agent, so that as a consequence of the described treatment, a controlled retardation of the absorption rate compared to a standard product not treated with reactive silicones results, without a drop in flowability of the highly swellable polymer of the invention having controlled absorption rate below a limit of 8 g/s.

Therefore, the invention is directed to swellable polymers absorbing aqueous liquids, characterized by being constituted of a) monomers bearing monoethylenically unsaturated acid groups, b) optionally, other monomers copolymerizable therewith, and c) optionally, water-soluble polymers suitable as basis for grafting, and d) at least diunsaturated monomers acting as crosslinkers, characterized in that the polymers have been treated with e) a reactive, water-insoluble hydrophobic polymer, and f) another reactive component capable of reacting with carboxyl groups or carboxylate anions to form additional crosslinking sites on the particle surface, and postcured.

The components a) through d) are contained in the corresponding polymer in the following amounts, relative to component a):

a) 60–99.99 wt.-%, preferably 90–99.9 wt.-%;

b) 0.1–35 wt.-%, preferably 0.5–20 wt.-%;

c) 0–30 wt.-%, preferably 0–20 wt.-%;

d) 0.01–3.0 wt.-%, preferably 0.05–1.0 wt.-%.

The amounts indicated refer to the weight of dry polymer.

Coating the highly swellable polymers with the hydrophobic polymer to be used according to the invention may be performed using the pure substance; however, the hydrophobic polymer to be used according to the invention may also be applied as a solution in a suitable organic solvent, such as chloroform, toluene, tetrahydrofuran, etc.

Suitable, chemically or physically reactive, water-insoluble, hydrophobic polymers are those which are thermally stable in a temperature range up to 250° C., forming water-insoluble, yet water-permeable polymer films at the surface of the highly swellable polymers absorbing aqueous liquids.

Furthermore, suitable reactive, water-insoluble, hydrophobic polymers are those forming polymer films which have no tendency of agglutinating within a temperature range of between 0° C. and 250° C.

Finally, suitable polymers are those, in particular, which themselves include functional groups that undergo physical and/or chemical interactions with the acid groups or carboxylate groups of the highly swellable polymers absorbing aqueous liquids, and thereby provide good spreading on the surface of same and remain fixed thereon even upon wetting with water.

Suitable hydrophobic polymers are homo- and copolymerizates of polysiloxanes having randomly distributed monomer units including secondary and additional primary amino groups which, as functional groups, undergo interaction with acid groups. The interaction may be a chemical bond or an electrostatic interaction.

Hydrophobic polysiloxanes preferably used according to the invention are poly[dimethyl-co-aminoalkylmethyl-co-methyl(polyether)]siloxanes and poly[dimethyl-co-aminoalkylmethyl]siloxanes in accordance with formula 1.

Formula 1 wherein n=50–99 m=1–50 k=1–11 i=1–12, and

R, R' represent H, alkyl, preferably methyl, hydroxyalkyl, aminoalkyl.

In addition, polydimethylsiloxanes, polydialkylsiloxanes as well as polyalkylarylsiloxanes and polydiarylsiloxanes having amino groups at the terminal siloxane units of the polysiloxane main chain are preferred.

Particularly preferred hydrophobic polymers to be used according to the invention are those amino-functional polysiloxanes having improved polymer emulsifiability in aqueous media as a result of polyether side chains at the polysiloxane backbone. Due to the modification of the extremely hydrophobic polysiloxane by hydrophilic polyether side chains, such as polyethylene oxide, these polysiloxanes, depending on the polyethylene oxide content relative to the amount of polysiloxane, turn into auto-emulsifying systems which then may be used together with the post-crosslinking agent in aqueous emulsions.

The hydrophobic polymers to be used according to the invention may be linear or branched. The viscosity of the polymers may range between 350 and 10,000 mPa·s. Mixtures of different polysiloxanes may be used.

By employing the hydrophobic polymers to be used according to the invention in combination with a second reagent resulting in additional crosslinking on the particle surface, e.g., di- or polyols, ethylene carbonate, or bis- or polyepoxides, the absorption rate of the highly swellable, crosslinked polyacrylates may be varied in a well-aimed fashion, with appropriate experimental conditions, by varying the amount of hydrophobic polymer. Advantageously, the time dependence of the absorption without external pressure can be adjusted in such a way that 70% of the absorptive capacity of the superabsorbent polymer is not reached already after 10 minutes but only after at least the 1.5 fold of said time period (cf., evaluation of FIG. 1 and/or Table 1).

Table 2 illustrates the time in minutes which is required for products of the invention (Examples 1 through 8) and prior art comparative products (V1 through V4) to reach 70% absorptive capacity, as well as the time factor by which said swelling period is extended relative to the comparative product V1 as a conventional superabsorber (reference substance).

The hydrophobic polymers to be used according to the invention are employed in amounts of between 0.005 wt.-% and 2 wt.-%. Preferably, between 0.01 wt.-% and 1.5 wt.-%, and more preferably between 0.05 and 0.8 wt.-% of modified, functional polysiloxane is employed.

Since surface coatings using polysiloxanes or other polymers such as polyethylene oxide, polyalkyl (meth)acrylates or polyamides reduce the flowability of the highly swellable polymers, it is not possible to apply unlimited quantity ratios as coating.

Rather, the amount of hydrophobic polymer used has an upper limit due to the flowability of the absorbent polymer granulates required for machine processing. Desirably, the flowability of the absorbent polymers is as good as possible. Products having a flowability of less than 8 g/s (measured using a funnel 10 mm in width at the outlet) are undesirable in technical terms.

Coating can be performed using a single hydrophobic substance or any mixture of the hydrophobic polymers described.

In a particularly preferred embodiment, the reactive hydrophobic polymer to be used according to the invention may be applied in its protonated form after neutralization of the amino groups with mineral acids or organic acids, emulsified or dissolved in water or organic solvent/water mixtures (Example 8).

The invention also relates to a process for producing the inventive swellable polymers absorbing aqueous liquids, characterized in that a swellable polymer absorbing aqueous liquids, constituted of a) monomers bearing monoethylenically unsaturated acid groups, b) optionally, other monomers copolymerizable therewith, and c) optionally, water-soluble polymers suitable as basis for grafting, and d) at least diunsaturated, powdered monomers acting as crosslinkers, is coated with at least e) one reactive, water-insoluble hydrophobic polymer, and f) at least one other reactive component capable of reacting with carboxyl groups or carboxylate anions to form additional crosslinking sites on the particle surface, and subsequently subjected to a thermal treatment in a temperature range of from 80 to 230° C., preferably from 170 to 200° C.

As reactive component f) capable of reacting with carboxyl groups or carboxylate anions to form additional crosslinking sites on the particle surface, di- or polyols, bisepoxides, higher epoxides, polyamines, polyamidoamines, or cyclic carbonic esters are preferably used, typically in amounts of from 0.1 to about 1 wt.-%, relative to the polymer from a) through d). Each of these surface crosslinking agents may react with at least 2 carboxyl groups of the hydrogels of the swellable polymer from a) through d) with covalent crosslinking on the surface of the granulate particles.

To this end, one or more of the reactive compounds mentioned are dissolved in water and/or an organic solvent and applied onto the surface of the dried, hydrophilic, highly swellable polymerizate. Suitable mixing units for applying the post-crosslinking agent are, e.g., Patterson-Kelley mixers, DRAIS turbulence mixers, Lödige mixers, Ruberg mixers, screw mixers, pan mixers, and fluid-bed mixers, as well as continuously operated vertical mixers wherein the powder is mixed at a rapid frequency using rotating knives (Schugi mixer). Where the production of the highly swellable polymers is performed according to the suspension polymerization process, the post-crosslinking agent may already be added to the suspension, i.e., prior to isolation of the polymer.

Subsequently, the polymerizate powder is subjected to a thermal treatment at temperatures of from 80 to 230° C., preferably between 170 and 200° C. The time period for additional heating is limited by that point where the desired properties pattern of the superabsorber is destroyed as a result of heat damage.

Coating of the highly swellable polymer using a multifunctional reactive compound resulting in an increase of the crosslinking density at the surface under elevated temperature and thus, in improved properties of the highly swellable polymer in absorption under pressure (e.g., post-crosslinking using ethylene carbonate, di- or polyols, bis- or polyepoxides) may be effected prior to (Examples 1–5, 7), together with (Examples 6 and 8) or subsequent to applying the hydrophobizing agent onto the highly swellable polymer. Likewise, heating during post-crosslinking required for improving the absorption properties under pressure may be performed prior to (Example 7), subsequent to or together with (Examples 1–6, 8) the postcuring step resulting in fixation of the hydrophobic polymer.

Where coating of the highly swellable polymers with the reactive hydrophobic polymers to be used according to the invention is performed according to the above-mentioned thermal treatment for improving the polymerizate absorption properties under pressure, a second postcuring procedure normally follows in order to fix the reactive hydrophobic polymer at the surface of the highly swellable polymerizate. Optionally, coating the superabsorber powder with hydrophobic polymer may also be carried out together with the surface crosslinking agent as an aqueous emulsion or simultaneously using separate dosage means in a single processing step prior to the subsequent heating step.

The postcuring step may be repeated several times. Suitable mixing units for mixing the hydrophobic reactive polymer with the highly swellable hydrophilic polymerizate include the above-mentioned screw mixer, Schugi mixer, etc.

In particular, it is possible to coat the hydrophobic polymer and the multifunctional compound successively onto the powdered, highly swellable polymer and carry out the necessary postcuring for surface post-crosslinking and simultaneous hydrophobizing in a single step (Examples 1–5).

In a particularly preferred embodiment of the process, the multifunctional compound and the hydrophobic polymer in the form of its salt are dissolved or emulsified in water and applied together as an acidic solution onto the superabsorbent polymer (Example 8).

Suitable for postcuring and performing the actual post-crosslinking reaction are, e.g., belt dryers, hot-air dryers or blade dryers.

The hydrophobizing agent to be used according to the invention may be applied as substance, as a solution in a suitable organic solvent, such as chloroform, toluene, tetrahydrofuran etc., or in its protonated form after neutralization of the amino groups with mineral acids or organic acids, emulsified or dissolved in water or organic solvents.

The highly swellable polymers of the invention having controlled absorption rate may be used in hygienic articles for absorbing body fluids.

Accordingly, the invention is also directed to the use of the highly swellable polymers of the invention in hygienic articles for absorbing body fluids.

Hydrophilic, highly swellable, powdered polymerizates to be used according to the invention are homo- and copolymerizates based on unsaturated carboxylic acids and/or derivatives thereof.

The unsaturated carboxylic acids and derivatives are exemplified by acrylic acid, methacrylic acid, itaconic acid and maleic acid and the alkaline, ammonium and amine salts or the amides thereof, such as (meth)acrylamide, N-tert-butyl(meth)acrylamide and N-isopropyl(meth)acrylamide, and acrylonitrile.

It is also possible to use other comonomers such as olefinic unsaturated sulfonic acids. Examples include the salts of 2-acrylamido-2-methylpropanesulfonic acid, styrenesulfonic acid, vinylsulfonic acid, allyl and methallylsulfonic acid, especially the alkaline, ammonium and amine salts thereof.

As further comonomers, the above-mentioned copolymerizates based on unsaturated carboxylic acids and derivatives thereof may include polyglycol esters of unsaturated acids, e.g., polyalkylene oxide (meth)acrylates of general formula 2:

Formula 2 wherein
 $R^1$=hydrogen or methyl,
 n=2–50, and
 $R^2$=hydrogen or an aliphatic, araliphatic or cycloaliphatic $C_1$–$C_{12}$ residue, e.g., methyl, ethyl or butyl.

The hydrophilic, highly swellable polymerizates forming the basis of the hydrogels of the invention are crosslinked, i.e., contain comonomers having at least two double bonds that are polymerized into the polymer network.

Suitable crosslinkers are esters of unsaturated carboxylic acids of polyols, such as ethylene glycol diacrylate, di-, tri- or polyethylene glycol diacrylate or methacrylate, butanediol diacrylate or methacrylate and trimethylolpropane triacrylate or methacrylate, ethoxylated trimethylolpropane triacrylate or methacrylate derivatives, pentaerythritol tetra(meth)acrylate, ethoxylated pentaerythritol tetra(meth)acrylate derivatives and allyl compounds such as (meth)allylpolyethylene glycol(meth)acrylate, tetraallyloxyethane, triallylamine, tetraallylammonium chloride, triallylmethylammonium chloride, and methylenebisacryl- or methacrylamide. These crosslinkers are normally used alone or in combination in amounts of from 0.05% to 1%.

The hydrophilic, highly swellable polymerizates forming the basis of the hydrogels of the invention may be produced using well-known polymerization processes. Predominantly, the polymerization is carried out in aqueous solution according to the process of the so-called gel polymerization. Other processes such as suspension polymerization processes are also common.

Therein, a solution in water is produced including the monomers, crosslinker and optionally other additives, such as polyvinyl alcohol or oligo- or polysaccharides such as starch or modified starch as an appropriate grafting basis. Such polymers and processes for their production are well-known in literature; for example, U.S. Pat. No. 4,076,663 describes the use of starch, and GB 1,490,128 polyvinyl alcohol and starch as a basis for grafting.

The monomer solution is neutralized to an extent of at least 25 mole-%, preferably at least 50 mole-%, and more preferably 50–80 mole-% as sodium, potassium or ammonium salt.

Conventionally, the polymerization is initiated using water-soluble free-radical initiator systems at temperatures of <15° C. As free-radical initiator systems, both redox systems such as ascorbic acid or sodium sulfite with water-soluble peroxides (e.g., hydrogen peroxide, tert-butyl hydroperoxide) and thermal initiators such as azobis(2-amidinopropane) dihydrochloride or persulfates are suitable. Preferably, a combination of a redox initiator system and thermal catalysis is used.

Once started, the polymerization proceeds to virtually quantitative conversion, utilizing the Trommsdorff-Norrish effect. The reaction is conducted adiabatically, the reaction medium may reach temperatures of up to 120° C., and the reaction may be carried out both at normal pressure and elevated pressure.

It is preferred to perform the polymerization under a protective gas atmosphere, preferably nitrogen.

The gel formed is subsequently crushed, dried, milled and screened to the desired particle size.

To improve the absorption under pressure, the polymerizates thus obtained are reacted in a powdered form with surface crosslinkers, i.e., compounds containing groups each of which can react with at least two carboxyl groups of the hydrogels to give covalent crosslinking on the surface of the granulate particle. Preferably, di- or polyols, bisepoxides, higher epoxides, polyamines, polyamidoamines, or cyclic carbonic esters are used, as described in the above-mentioned patents. Typically, amounts of from 0.1 to about 1 wt.-% are used in surface post-crosslinking.

Testing Methods

Retention

The retention is determined according to the tea bag method and indicated as average value from three measurements. About 200 mg of superabsorber is welded in a tea bag and immersed in a 0.9% saline solution for 30 minutes. Subsequently, the tea bag is suspended to drain for 10 minutes. Thereafter, the tea bag is centrifuged in a centrifuge (23 cm in diameter, 1,400 rpm) for 5 minutes and weighed. A tea bag having no superabsorber is run as a so-called blank. The retention is calculated according to the formula:

$$\text{Retention} = \frac{\text{Final weight} - \text{Blank} - \text{Initial weight}}{\text{Initial weight}}$$

and is indicated in g/g.

Solubles

The solubles are determined as described in U.S. Pat. No. 4,654,039, with the exception that a 0.9% saline solution is used as test liquid instead of synthetic urine.

Flowability

The flow rate of superabsorbent polymers is determined by allowing a representative sample (A)=100 g to flow through a flow funnel (according to DIN 53492 at an inclination angle of 40°, and a nozzle according to DIN 53492, having an orifice of 10 mm±0.1 mm) into a vessel of sufficient volume. Initially, the orifice at the bottom side of the funnel must be closed. The sample is cautiously poured into the funnel. The vessel is placed underneath the orifice of the funnel. The funnel may not be exposed to shocks and concussions. Once the orifice has been opened, the time (F) required by the sample to pass through is measured, recorded with an accuracy of 0.1 g/s, and related to 1 g. The flow rate is given in g/s with an accuracy of 0.1 g/s.

In cases where the orifice has been opened and the sample does not flow, the sample is rated as non-flowing.

$$\text{Flow rate (g/s)} = \frac{A\ [g]}{F\ [s]}$$

Time-dependent Absorption with Free Swelling 500 mg±0.5 mg of superabsorber is weighed in a plexiglass cylinder 5 cm in diameter having a stainless steel screen bottom with a mesh width of 43 μm. The accurate initial weight of the superabsorber (SAP initial weight) and the weight of the plexiglass cylinder including SAP (dry gross weight) are recorded. The plexiglass cylinder including the superabsorber is placed on a zero porosity glass frit 120 mm in diameter in a bath containing 0.9 wt.-% saline solution, so that the screen bottom is situated at least 20 mm beneath the level of the saline solution. In this way, it is ensured that the highly swellable, crosslinked polymer is immersed in a large excess of saline solution at any moment of measurement. When reaching the maximum swelling volume of the superabsorber in the plexiglass cylinder, the filling level of the saline solution in the vessel must be sufficient so as to prevent the absorbent gel from swelling beyond the level of the saline solution.

The measuring intervals may be selected arbitrarily; preferably, the cylinder was taken out of the bath after 5, 10, 15, 30, 60, and 120 minutes in each case. It is possible to increase the swelling period to, e.g., 4 or 8 hours. The major part of non-absorbed saline solution contained in the plexiglass cylinder discharges through the screen fabric at the bottom, the remainder of non-bonded liquid is sucked off by placing the plexiglass cylinder on a suction flask fitted with a rubber gasket (Ø=6 cm), which flask is under slight vacuum provided by a water suction pump.

Drops of liquid still adhering to the plexiglass cylinder after the non-bonded saline solution has been sucked off are removed by placing the plexiglass cylinder on domestic absorbent paper fleece.

The thus treated plexiglass cylinder including the swelled superabsorber is weighed with an accuracy of two decimal places (gross weight after swelling) using an analytical balance and then immediately replaced into the bath including the NaCl solution. The absorption upon free swelling is calculated according to the formula:

$$\text{Absorption }(t) = \frac{(\text{Gross weight after swelling }(t)) - (\text{Dry gross weight})}{\text{SAP inital weight}}$$

The numerical values thus obtained may be evaluated graphically by plotting the absorption (t) versus time t.

Fluff Combination Absorption Test (FCAT)

In this testing method, the swelling rate is determined by computer-aided recording of the absorption of a superabsorber/cellulose mixture under a pressure of 21 g/cm².

Preparation of the Cellulose Absorber Pads:

2.0000±0.0005 g of cellulose is weighed on an analytical balance. The cellulose is used to form two or more cellulose plies. One cellulose ply is placed onto the analytical balance. Subsequently, e.g., 0.2000±0.0005 g of superabsorber is sprinkled over the cellulose ply as uniformly as possible. The second cellulose ply is placed on top, so that a cellulose/SAP/cellulose sandwich is formed. In the preparation of the cellulose-SAP pads, the amount of SAP may be varied at will. The superabsorber may also be sprinkled into several plies. The amount of superabsorber used and the number of SAP plies are recorded. Preferably, an occupancy of 60%, i.e., 1.2 g of SAP on 2.0 g cellulose is used.

For the blank sample, a pad of 2.0000±0.0005 g of fluff is prepared without superabsorber.

Figure 6:
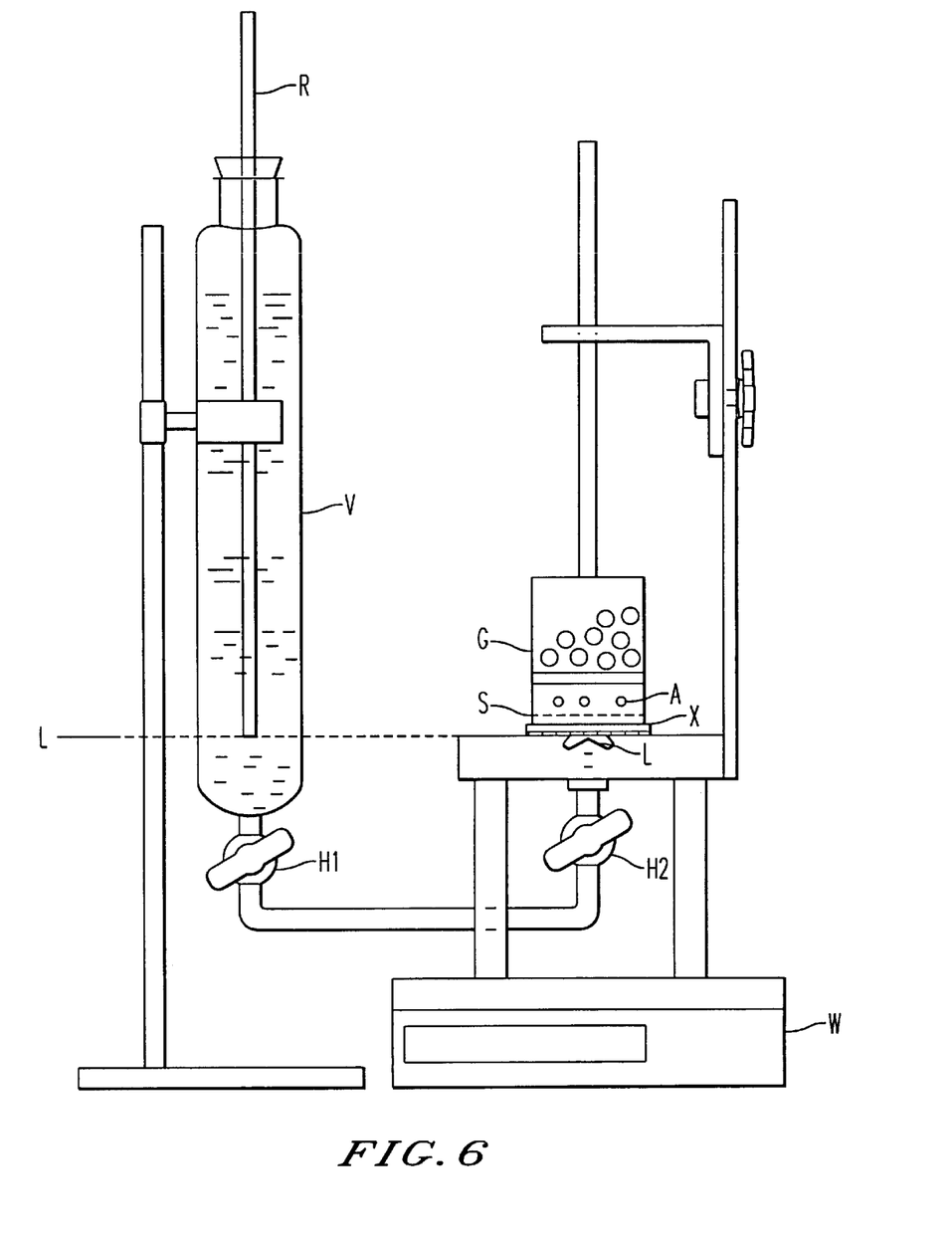

Test performance:

The testing apparatus is illustrated schematically in FIG. 6.

The liquid level of the tubelet in the dropping funnel and the level of the testing apparatus table (discharge of liquid) should comply.

The prepared pad is placed on the testing apparatus in such a fashion that the opening for the liquid is in a central position underneath the pad. The specimen is loaded with a weight corresponding to 21 g/cm². Higher loads are also possible.

To determine the overall absorption of liquid, the balance is tared to 0.00 g. Measurement of the absorption curve is initiated by opening the cocks H1 and H2 and simultaneously starting the recorder connected to the balance. The recorder automatically stores the weight detected by the balance W. During measurement, the weight continuously increases as a result of the absorption of liquid. The blank is recorded in the same manner using a cellulose pad (2.0000±0.0005 g) with no superabsorber. The amount of liquid absorbed by the blind sample is also recorded automatically, and the values measured for the blind sample are subtracted from those of the cellulose-SAP pad. Thereby, the absorption behavior of the pure superabsorber is obtained. By dividing these numerical values by the initial weight of superabsorber in grams, the time-dependent absorption of the superabsorbers per gram of superabsorber can be calculated.

The numerical values thus calculated may be illustrated graphically by plotting the absorption versus swelling rate.

Preparation of a Starting Material for Post-crosslinking and Hydrophobizing

Polymer A

A solution of acrylic acid, crosslinkers (0.2% trimethylolpropane triethoxylate triacrylate and 0.3% a-allyloxypolyethylene glycol acrylate) and 2% methoxypolyethylene glycol methacrylate in water, partially neutralized with sodium hydroxide solution to an extent of 70 mole-%, is polymerized by addition of initiators (15 ppm of ascorbic acid, 100 ppm of 2,2'-azobis(2-amidinopropane) dihydrochloride, 100 ppm of hydrogen peroxide solution, and 150 ppm of sodium peroxodisulfate) according to well-known procedures.

Once polymerization is completed, the gel-like polymer block is crushed, and dried at 150° C. for 120 minutes. Thereafter, the polymer is milled and screened for the grain fraction of 150–850 µm.

A highly swellable polymer having a retention of 38 g/g in 0.9% saline solution is obtained. The polymer A further contains about 5% extractable components (measured after 1 h).

In the examples and comparative examples below, the following hydrophobic polymers were used in the surface treatment of the polymer A starting material:
NM 4266-750 silicone oil (commercial product of HÜLS Silicone GmbH, Nünchritz)
This is a random polysiloxane copolymer in accordance with formula 1, with n=99 and m=1, k=3 and i=2, having a viscosity of about 750 mPa·s.
NM 4266-1000 silicone oil (commercial product of HÜLS Silicone GmbH, Nünchritz)
This is a random polysiloxane copolymer having about 6 mole-% of comonomer units containing amino groups and a viscosity of about 1000 mPa·s.
Magnasoft HSSD (commercial product of OSi Specialities)
The product is a amino-modified polyether silicone having about 0.25% nitrogen content and a viscosity of about 3700 mPa·s.
AP 500 silicone oil
The product is a polydimethylsiloxane and free of functional groups, having a viscosity of about 500 mPa·s.

EXAMPLE 1

150 g of a powdered superabsorber polymer A is charged in a vertically arranged laboratory mixer with high-speed knives and initially, 0.75 g of ethylene carbonate dissolved in a mixture of 3 g of water and 6 g of acetone is added at 1000 rpm. Subsequently, 0.15 g of NM 4266-750 silicone oil is applied at 1000 rpm. The product thus treated is postcured for 30 minutes at 190° C. in a circulating air oven. The results can be inferred from Table 1.

EXAMPLE 2

150 g of a powdered superabsorber polymer A is charged in a vertically arranged laboratory mixer with high-speed knives and initially, 0.75 g of ethylene carbonate dissolved in a mixture of 3 g of water and 6 g of acetone is added at 1000 rpm. Subsequently, 0.3 g of NM 4266-750 silicone oil (commercial product of HÜLS Silicone GmbH, Nünchritz) is applied at 1000 rpm. The product thus treated is postcured for 30 minutes at 190° C. in a circulating air oven. The results can be inferred from Table 1.

EXAMPLE 3

150 g of a powdered superabsorber polymer A is charged in a vertically arranged laboratory mixer with high-speed knives and initially, 0.75 g of triethanolamine dissolved in a mixture of 3 g of water and 6 g of acetone is added at 1000 rpm. Subsequently, 1.2 g of NM 4266-750 silicone oil (commercial product of HÜLS Silicone GmbH, Nünchritz) is applied at 1000 rpm. The product thus treated is postcured for 30 minutes at 190° C. in a circulating air oven. The results can be inferred from Table 1.

EXAMPLE 4

150 g of a powdered superabsorber polymer A is charged in a vertically arranged laboratory mixer with high-speed knives and initially, 0.75 g of ethylene carbonate dissolved in a mixture of 3 g of water and 6 g of acetone is added at 1000 rpm. Subsequently, 1.2 g of NM 4266-750 silicone oil (commercial product of HÜLS Silicone GmbH, Nünchritz) is applied at 1000 rpm. The product thus treated is postcured for 30 minutes at 190° C. in a circulating air oven. The results can be inferred from Table 1.

EXAMPLE 5

150 g of a powdered superabsorber polymer A is charged in a vertically arranged laboratory mixer with high-speed knives and initially, 0.75 g of ethylene carbonate dissolved in a mixture of 3 g of water and 6 g of acetone is added at 1000 rpm. Subsequently, 2.25 g of NM 4266-750 silicone oil (commercial product of HÜLS Silicone GmbH, Nünchritz) is applied at 1000 rpm. The product thus treated is postcured for 30 minutes at 190° C. in a circulating air oven. The results can be inferred from Table 1.

EXAMPLE 6

150 g of a powdered superabsorber polymer A is charged in a vertically arranged laboratory mixer with high-speed knives and coated at 1000 rpm with an emulsion consisting of 0.75 g of ethylene carbonate, 2.25 g of water and 0.3 g of Magnasoft HSSD silicone oil (commercial product of OSi, Düsseldorf). The product thus treated is postcured for 30 minutes at 190° C. in a circulating air oven. The results can be inferred from Table 1.

EXAMPLE 7

150 g of a powdered superabsorber according to Comparative example V1 is charged in a vertically arranged laboratory mixer with high-speed knives and treated with 0.3 g of NM 4266-750 silicone oil (product of HÜls Silicone GmbH, Nünchritz) at 1000 rpm. The product thus produced is post-cured for 30 minutes at 190° C. in a circulating air oven. The results can be inferred from Table 1.

EXAMPLE 8

150 g of a powdered superabsorber polymer A is charged in a vertically arranged laboratory mixer with high-speed knives and added with 0.75 g of ethylene carbonate dissolved in a clear, transparent emulsion consisting of 2.25 g of water, 0.15 g of acetic acid (60%), 0.3 g of NM 4266-1000 silicone oil (product of Hüls Silicone GmbH, Nünchritz) and 6 g of acetone at 1000 rpm. The product thus treated is postcured for 30 minutes at 190° C. in a circulating air oven. The results can be inferred from Table 1.

EXAMPLE 9

2.0000±0.0005 g of cellulose is weighed on an analytical balance. The cellulose is used to form three cellulose plies. One cellulose ply is placed onto the analytical balance. Subsequently, 0.6000±0.0005 g of superabsorber according to Example 1 is sprinkled over the cellulose ply as uniformly as possible. The second cellulose ply is placed on top, so that a cellulose/SAP/cellulose sandwich is formed. Again, 0.600 g±0.0005 g of superabsorber according to Example 1 is sprinkled thereon as uniformly as possible. The third cellulose ply is placed on top. The amount of superabsorber used and the number of SAP plies are recorded.

The pad thus prepared is subsequently examined in the FCAT testing apparatus.

Figure 5:
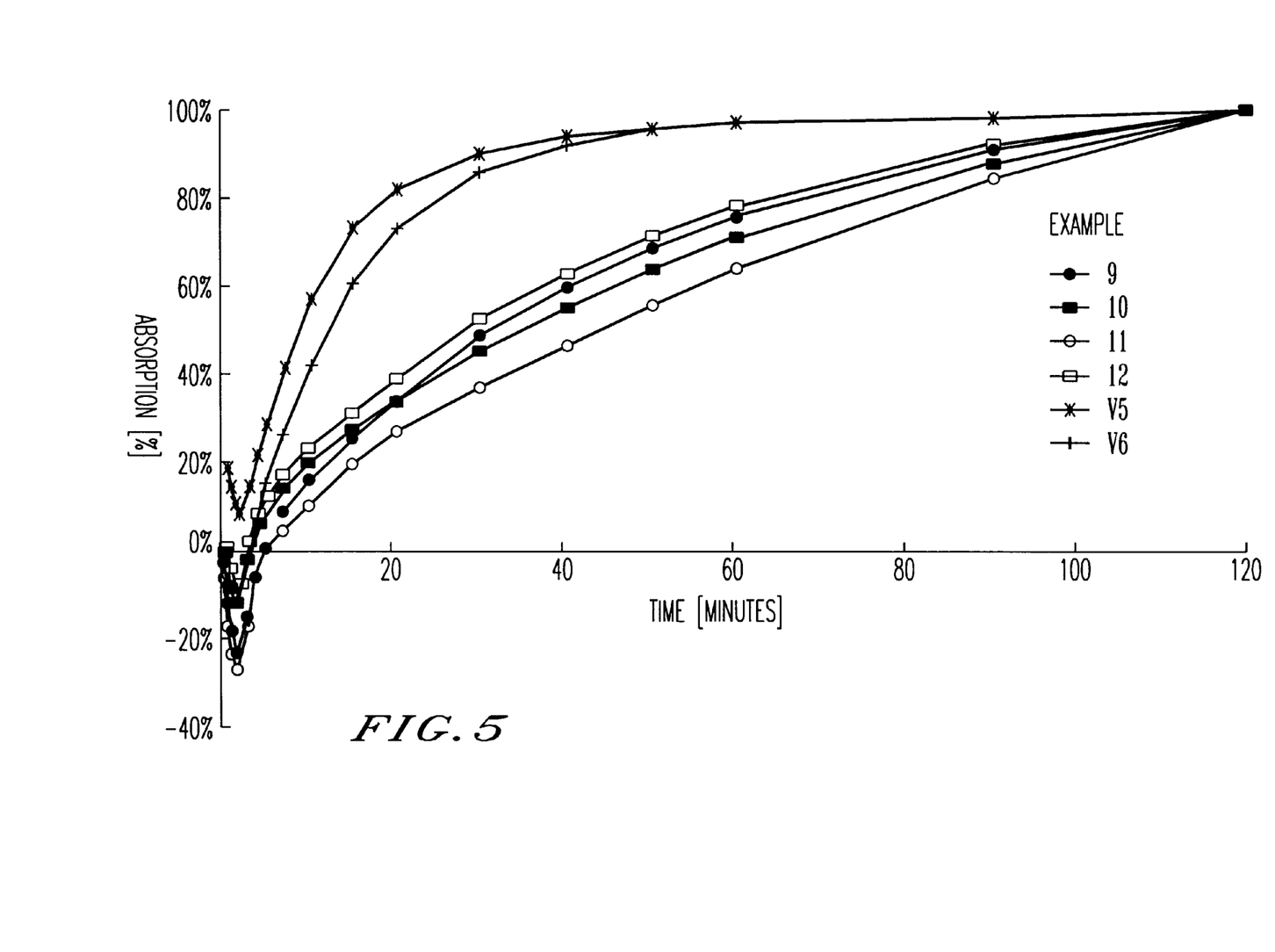

For the blank sample, a pad having 2.0000±0.0005 g of fluff is prepared without superabsorber. The result in the form of the recorded curve can be inferred from FIG. 5.

EXAMPLE 10

A superabsorber-cellulose pad is prepared according to the embodiment of Example 9 but using the superabsorber of Example 2.

Subsequently, the pad is examined in the FCAT testing apparatus.

For the blank sample, a pad having 2.0000±0.0005 g of fluff is prepared without superabsorber. The result in the form of the recorded curve can be inferred from FIG. 5.

EXAMPLE 11

A superabsorber-cellulose pad is prepared according to the embodiment of Example 9 but using the superabsorber of Example 5.

Subsequently, the pad is examined in the FCAT testing apparatus.

For the blank sample, a pad having 2.0000±0.0005 g of fluff is prepared without superabsorber. The result in the form of the recorded curve can be inferred from FIG. 5.

EXAMPLE 12

A superabsorber-cellulose pad is prepared according to the embodiment of Example 9 but using the superabsorber of Example 6.

Subsequently, the pad is examined in the FCAT testing apparatus.

For the blank sample, a pad having 2.0000±0.0005 g of fluff is prepared without superabsorber. The result in the form of the recorded curve can be inferred from FIG. 5.

COMPARATIVE EXAMPLE 1

150 g of a powdered superabsorber polymer A is charged in a vertically arranged laboratory mixer with high-speed knives and initially, 0.75 g of ethylene carbonate dissolved in a mixture of 3 g of water and 6 g of acetone is added at 1000 rpm. The product thus treated is then postcured for 30 minutes at 190° C. in a circulating air oven. The results can be inferred from Table 1.

COMPARATIVE EXAMPLE 2

150 g of a powdered superabsorber polymer A is charged in a vertically arranged laboratory mixer with high-speed knives and initially, 0.75 g of ethylene carbonate dissolved in a mixture of 3 g of water and 6 g of acetone is added at 1000 rpm. Subsequently, 1.8 g of AP 500 silicone oil (Wacker GmbH) is applied at 1000 rpm. The product thus treated is postcured for 30 minutes at 190° C. in a circulating air oven. The results can be inferred from Table 1.

COMPARATIVE EXAMPLE 3

150 g of the powdered superabsorber from Comparative example 1 is treated with 1.2 g of NM 4266-750 silicone oil in a vertically arranged laboratory mixer with high-speed knives at 1000 rpm. The swelling properties of the product thus treated are determined without further heating. The results can be inferred from Table 1.

COMPARATIVE EXAMPLE 4

150 g of the powdered superabsorber polymer A is coated with 1.2 g of silicone oil NM 4266-750 in a vertically arranged laboratory mixer with high-speed knives at 1000 rpm. The product thus treated is then postcured for 30 minutes at 190° C. in a circulating air oven. The results can be inferred from Table 1.

COMPARATIVE EXAMPLE 5

A superabsorber-cellulose pad is prepared according to the embodiment of Example 9 but using the superabsorber of Comparative example 1.

Subsequently, the pad is examined in the FCAT testing apparatus.

For the blank sample, a pad having 2.0000±0.0005 g of fluff is prepared without superabsorber. The result in the form of the recorded curve can be inferred from FIG. 5.

COMPARATIVE EXAMPLE 6

A superabsorber-cellulose pad is prepared according to the embodiment of Example 9 but using the superabsorber of Comparative example 2.

Subsequently, the pad is examined in the FCAT testing apparatus.

For the blank sample, a pad having 2.0000±0.0005 g of fluff is prepared without superabsorber. The result in the form of the recorded curve can be inferred from FIG. 5.

Figure 1:
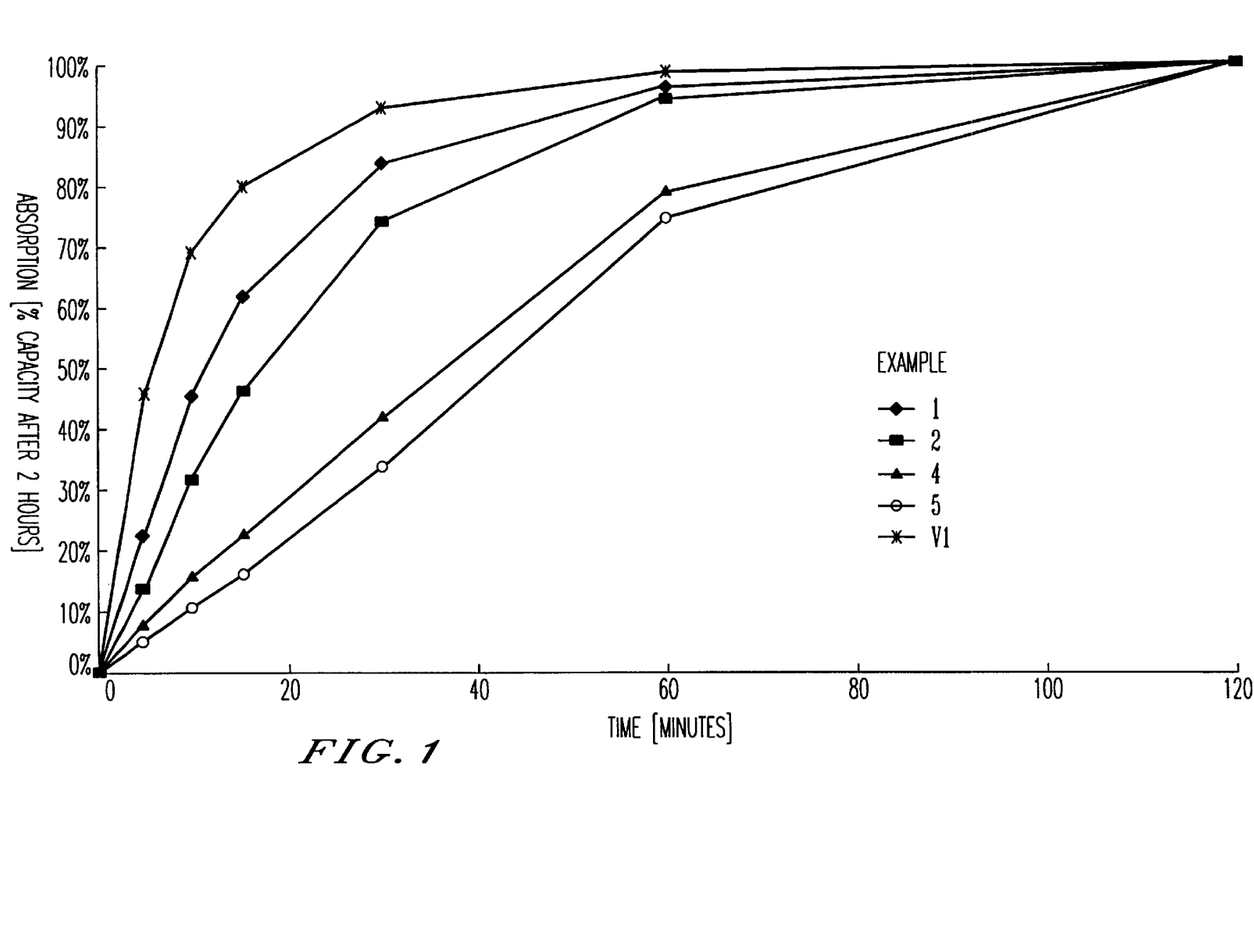

FIG. 1 illustrates the dependence of the swelling behavior on the amount of functional silicone oil to be used according to the invention, wherein the absorption of the products under free swelling conditions (large excess of solvent, swelling without pressure) is plotted versus the swelling period.

The products 1, 2, 4, and 5 were treated with varying amounts of functional silicone oils to be used according to the invention. The swelling rate of the products is markedly dependent on the percentage of hydrophobic polymer. Therefore, the absorption rate of the highly swellable polymers can be controlled directly through the amount of hydrophobic polymer.

Figure 2:
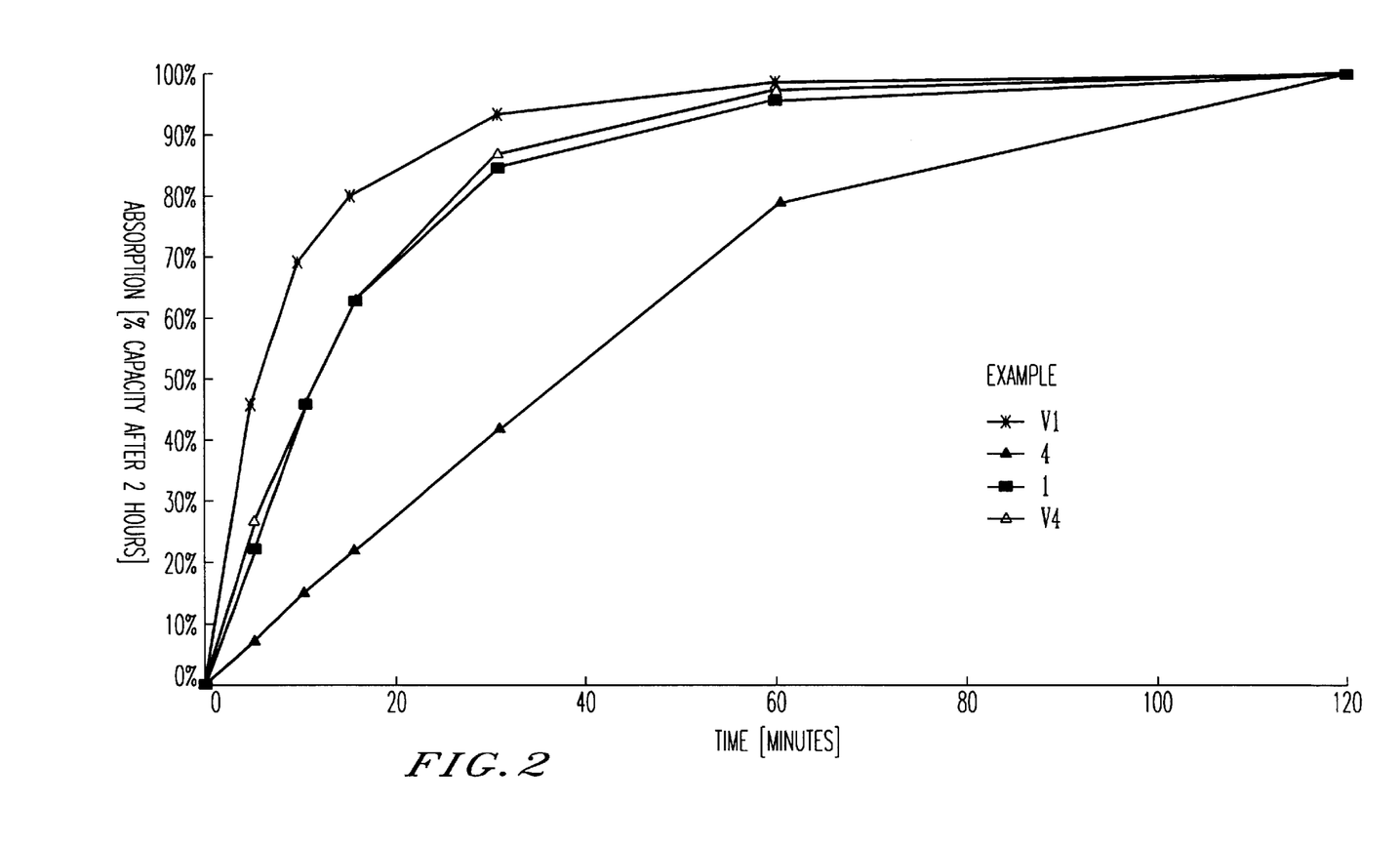

Product V4 shows an absorption behavior roughly corresponding to that of the product according to Example 1 (FIG. 2). Product 1 was prepared using only 0.1 wt.-%, i.e., one eighth of the amount of functional silicone oil to be used according to the invention employed in V4, thereby achieving a markedly improved flowability compared to product V4 (product 1: 11.5 g/s, V4: 7.7 g/s, cf., Table 1). Thus, the flowability of product 1 comes close to the optimum flowability of the uncoated reference product V1 (12 g/s).

Comparative example V4 shows that even without using a reactive component resulting in additional crosslinking of the polymer particles at their surface (so-called post-crosslinkers), there is a specific effect on the absorption rate. However, this effect is comparatively small. As a result of the considerably larger amounts, e.g., of silicone oil that would be necessary, products produced in this manner, having an absorption rate within the preferred range, are lacking flowability, which is undesirable.

Figure 3:
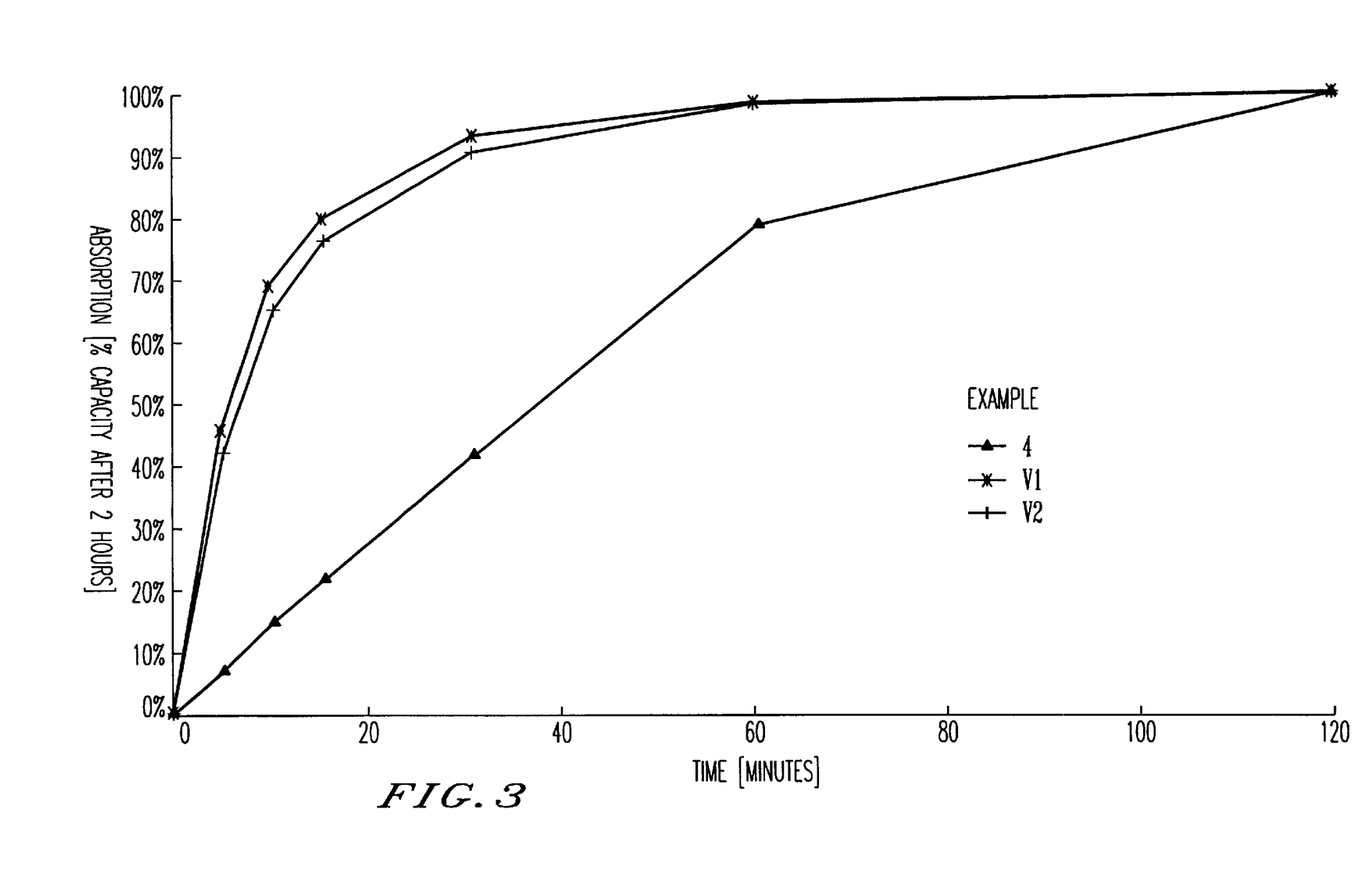

FIG. 3 shows that when using a hydrophobic polymer without functional groups (Comparative example V2: polydimethylsiloxane) under conditions required for the production of highly swellable polymers having controlled absorption rate, no substantial deviation from the swelling behavior of a highly swellable polymer not coated with hydrophobic polymers is achieved (Example V1). Similarly, such behavior is rated as an indication that the hydrophobic polymer must be fixed at the surface of the highly swellable polymer particles via functional groups.

Figure 4:
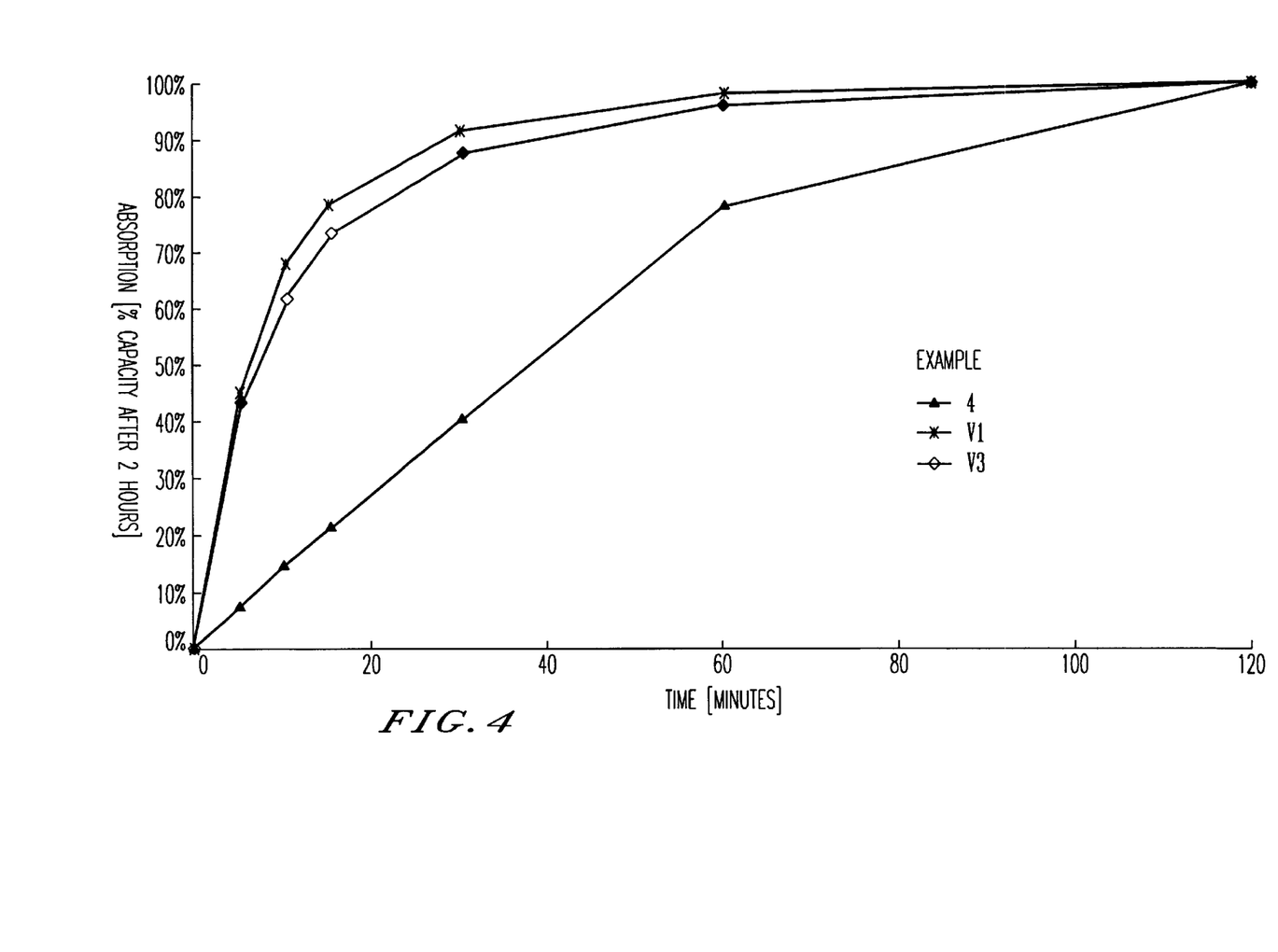

FIG. 4 illustrates the difference in swelling behavior of two products having the same amount of functional silicone oil to be used according to the invention, where the product from Example 4 has been postcured at 190° C. while the product from Comparative example V3 has not been heated.

Comparative example V1 relates to the surface-post-crosslinked highly swellable polymer produced without the functional silicone oil to be used according to the invention.

The two comparative products V1 and V3 show a conforming absorption behavior, while the product from Example 4 exhibits a significantly more gradual absorption curve. Without intending to limit the scope of the present invention, the assumption is made that in order to generate products having the desired absorption behavior and acceptable flowability ($\geq 8$ g/s), a fixation of the functional silicone oils to be used according to the invention at the surface of the hydrophilic, highly swellable polymer is necessary, which is achieved by the postcuring step.

The property of controlled retardation of the absorption rate is retained even in that case where the superabsorber particles are present separated from each other and fixed in a cotton pad. Thus, the change in swelling behavior by hydrophobic coating with polymers according to the invention is a property of the individual particle and not a result of agglomeration of individual particles into a hydrophobic agglomerate having a reduced surface area.

The fluff combination absorption test is useful as an experiment for examining the swelling rate of particles separated from each other. In this test, a pad consisting of highly swellable polymers and cotton fluff is prepared and exposed to pressure. The pressure may be varied between 7 g/cm$^2$ and 70 g/cm$^2$. Higher pressures are also possible. Subsequently, supply of test solution is allowed to proceed from underneath without pressure. In this test, the capillary forces of the cotton fluff have a wetting effect on the individual particles. The absorption of liquid over time is recorded and converted into an absorption curve (cf., FIG. 5). A comparison of the absorption curves of V5 (including superabsorber V1 with no hydrophobizing), V6 (including superabsorber V2, hydrophobized with a non-reactive, pure polydimethylsiloxane), and the products of the invention according to Examples 9–12 (containing the superabsorbers 1, 2, 5, and 6) clearly demonstrates the retardation of the absorption rate of highly swellable polymers having an aminosilicone coating.

This property of controlled retardation of the absorption rate is in contrast to the product property relating to an improvement of the absorption under pressure with good "initial absorbency" as described in EP-A 705,643.

The Examples 2 through 5 in EP-A 705,643 show that the absorption of superabsorbent polymers that were treated with silicone oil including amino or epoxy functional groups is higher after 10 minutes both prior to and after postcuring of the materials and thus, the absorption rate is higher than that of materials according to the Comparative examples 1 through 8, which were not surface-treated. However, the present invention is directed to the opposite of improving the absorption shortly after the onset of swelling. Rather, the advantage of the highly swellable polymers of the invention is that a significant improvement of the liquid distribution within the absorptive core of a hygienic article is achieved as a result of the retardation of superabsorber swelling.

TABLE 1

| Example No. | Additive Designation | Amount [wt. – % SAP] | Time [minutes] 0 | 5 | 10 | 15 | 30 | 60 | 120 | Flowability g/s |
|---|---|---|---|---|---|---|---|---|---|---|
| 1 | NM 4266-750 | 0.1 | 0 | 9 | 18.5 | 25.5 | 34.5 | 39.5 | 41 | 11.5 |
|   |   | 0.1 | 0% | 22% | 45% | 62% | 84% | 96% | 100% |   |
| 2 | NM 4266-750 | 0.2 | 0 | 6 | 14 | 20.5 | 33.5 | 42.5 | 45 | 10.5 |
|   |   | 0.2 | 0% | 13% | 31% | 46% | 74% | 94% | 100% |   |
| 3 | NM 4266-750 | 0.8 | 0 | 5 | 10 | 16 | 27 | 35 | 37.5 | 8 |
|   |   | 0.8 | 0% | 13% | 27% | 43% | 72% | 93% | 100% |   |
| 4 | NM 4266-750 | 0.8 | 0.0 | 3.0 | 6.0 | 8.5 | 16.0 | 31.0 | 39.0 | 8 |
|   |   | 0.8 | 0% | 8% | 15% | 22% | 41% | 79% | 100% |   |
| 5 | NM 4266-750 | 1.5 | 0 | 2 | 4 | 6 | 12.5 | 28.5 | 38 | 5.5 |
|   |   | 1.5 | 0% | 5% | 11% | 16% | 33% | 75% | 100% |   |
| 6 | Magnasoft HSSD | 0.2 | 0 | 11 | 21 | 27 | 34.5 | 38 | 39 | 12 |
|   |   | 0.2 | 0% | 28% | 54% | 69% | 88% | 97% | 100% |   |
| 7 | NM 4266-750 | 0.2 | 0 | 8 | 16.5 | 20.5 | 29 | 35 | 37 | 12.1 |
|   |   | 0.2 | 0% | 22% | 45% | 55% | 78% | 95% | 100% |   |
| 8 | NM 4266-1000 | 0.2 | 0 | 6.5 | 14.5 | 20.5 | 30 | 34.5 | 36.5 | 12.4 |
|   |   | 0.2 | 0% | 18% | 40% | 56% | 82% | 95% | 100% |   |
| V1 | None | 0 | 0 | 19.5 | 29.5 | 34 | 39.5 | 42 | 42.5 | 12 |
|   |   | 0 | 0% | 46% | 69% | 80% | 93% | 99% | 100% |   |
| V2 | AP 500 silicone oil | 1.2 | 0 | 16.5 | 26 | 30.5 | 36 | 39 | 39.5 | 6.5 |
|   |   | 1.2 | 0% | 42% | 66% | 77% | 91% | 99% | 100% |   |

TABLE 1-continued

| Example | | Additive | | Time [minutes] | | | | | | | Flowability |
|---|---|---|---|---|---|---|---|---|---|---|---|
| No. | Designation | Amount [wt. – % SAP] | 0 | 5 | 10 | 15 | 30 | 60 | 120 | | g/s |
| V3 | NM 4266-750 | 0.8 | 0 | 18.5 | 26.5 | 31.5 | 37.5 | 40.8 | 42 | | 8 |
| | | 0.8 | 0% | 44% | 63% | 75% | 89% | 97% | 100% | | |
| V4 | NM 4266-750 | 0.8 | 0.0 | 12 | 20 | 28 | 39 | 44 | 45 | | 7.7 |
| | | 0.8 | 0% | 27% | 44% | 62% | 87% | 98% | 100% | | |

Absorption data in g/g or %

TABLE 2

| Example | Time [minutes] | Time factor |
|---|---|---|
| 1 | 20 | 2 |
| 2 | 27 | 2.7 |
| 3 | 29 | 2.9 |
| 4 | 52 | 5.2 |
| 5 | 56 | 5.6 |
| 6 | 15.5 | 1.55 |
| 7 | 24.5 | 2.45 |
| 8 | 22.5 | 2.25 |
| V1 | 10 | 1 |
| V2 | 12 | 1.2 |
| V3 | 13 | 1.3 |
| V4 | 19.5 | 1.95 |

What is claimed is:

1. A swellable polymer capable of absorbing aqueous liquids, comprised of
   a) monomers bearing monoethylenically unsaturated acid groups,
   b) optionally, other monomers copolymerizable therewith, and
   c) optionally, water-soluble polymers suitable as basis for grafting, and
   d) at least di-unsaturated monomers acting as crosslinkers,
   wherein the polymer has been coated with
   e) a reactive, water-insoluble hydrophobic polymer of general formula 1 wherein
   n=50–99
   m=1–50
   k=1–11
   i=1–12, and
   R=H, alkyl, hydroxyalkyl, aminoalkyl,
   R'=H, alkyl, hydroxyalkyl, aminoalkyl,
   f) another reactive component capable of reacting with carboxyl groups or carboxylate anions to form additional crosslinking sites on the particle surface, and postcured.

2. The polymer according to claim 1, wherein the hydrophobic polymer according to formula 1 is additionally provided with polyether side-chains on the polysiloxane backbone.

3. The polymer according to claim 1, wherein they contain the hydrophobic polymers e) in amounts of from 0.005 to 2 wt.-%, relative to the polymer from a) through d).

4. The polymer according to claim 1, which contains ethylene carbonate and/or polyhydric alcohols as component f).

5. The polymer according to claim 4, which contains ethylene carbonate and/or polyhydric alcohols as component f).

6. The polymer of claim 1, wherein said postcuring is effected within a temperature range of from 80 to 230° C.

7. The polymer of claim 1, which have a flowability of more than or equal to 8 g/s, measured according to DIN 53492.

8. The polymers of claim 1, wherein 70% of the maximum absorptive capacity of the superabsorbent polymer will not be reached after only 10 minutes but, at the earliest, after a 15 minutes swelling time without pressure load.

9. A process for the production of the highly swellable polymer according to claim 1, which absorb aqueous liquids, characterized in that a swellable polymer absorbing aqueous liquids, constituted of
   a) monomers bearing monoethylenically unsaturated acid groups,
   b) optionally, other monomers copolymerizable therewith, and
   c) optionally, water-soluble polymers suitable as basis for grafting, and
   d) at least di-unsaturated monomers acting as crosslinkers, characterized in that the polymers have been coated with
   e) a reactive, water-insoluble hydrophobic polymer of general formula 1 wherein n=50–99
m=1–50
k=1–11
i=1–12, and
R=H, alkyl, hydroxyalkyl, aminoalkyl,
R'=H, alkyl, hydroxyalkyl, aminoalkyl, and f) at least one other reactive component capable of reacting with carboxyl groups or carboxylate anions to form additional crosslinking sites on the particle surface, and subsequently subjected to a thermal treatment in a temperature range of from 80 to 230° C.

10. The process according to claim 9, wherein the hydrophobic polymer according to formula 1 has been provided with additional polyether side-chains on the polysiloxane backbone prior to the reaction.

11. The process according to claim 9, wherein the hydrophobic polymers e) are used in amounts of from 0.005 to 2 wt.-%, relative to the swellable polymer constituted of a) through d).

12. The process according to claim 9, wherein the reactive, water-insoluble hydrophobic polymer e) is used in its protonated form.

13. The process according to claim 9, wherein the hydrophobic polymer e) in its protonated form is applied onto the swellable polymer from a) through d) together with the multi-functional compound f) as a solution or emulsion in water.

14. The process according to claim 9, wherein the swellable polymer constituted of a) through d) is coated with the multi-functional reactive compound f) prior to, simultaneously with, or after coating with the hydrophobic, reactive polymer e).

15. The process according to claim 9, wherein each coating step in the separate coating of the swellable polymer from a) through d) with reactive hydrophobic polymer e) and multifunctional compound f) is followed by a postcuring step.

16. The process according to claim 9, wherein merely a subsequent heat treatment is performed in the simultaneous coating of the swellable polymer from a) through d) with hydrophobic polymer e) and multifunctional compound f).

17. A method of using the polymers according to claim 9, by incorporating said polymers into hygiene articles for absorbing body fluids.

\* \* \* \* \*